Figure 1:
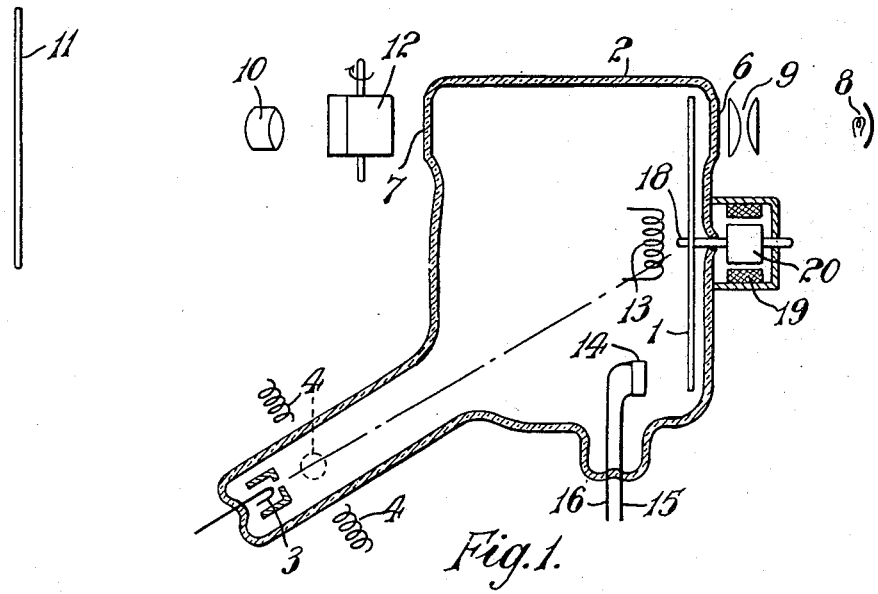

Feb. 12, 1952 — A. H. ROSENTHAL — 2,585,846
RECEIVER TUBE HAVING MOVABLE SCREEN WITH IONIC CRYSTAL LAYER FOR LIGHT MODULATION
Filed Feb. 28, 1948 — 2 SHEETS—SHEET 1

Inventor
Adolf Henrich Rosenthal

Feb. 12, 1952 — A. H. ROSENTHAL — 2,585,846
RECEIVER TUBE HAVING MOVABLE SCREEN WITH
IONIC CRYSTAL LAYER FOR LIGHT MODULATION
Filed Feb. 28, 1948 — 2 SHEETS—SHEET 2

Inventor
Adolf Reunich Rosenthal

Patented Feb. 12, 1952

2,585,846

UNITED STATES PATENT OFFICE 2,585,846

RECEIVER TUBE HAVING MOVABLE SCREEN WITH IONIC CRYSTAL LAYER FOR LIGHT MODULATION

Adolph H. Rosenthal, New York, N. Y., assignor, by mesne assignments, to Skiatron Electronics and Television Corporation, a corporation of New York Application February 28, 1948, Serial No. 12,036
In Great Britain June 1, 1939

Section 1, Public Law 690, August 8, 1946
Patent expires June 1, 1959

30 Claims. (Cl. 178—7.5)

This invention relates to television and like receiving systems.

In my Patent No. 2,330,171, issued September 21, 1943, Reissue 22,734 dated March 19, 1946, there are described television receiving systems employing a novel form of image screen which includes a transparent crystalline material which, when subjected to the effect of a suitable radiation, such as cathode rays or light of a suitable wave length, exhibits an opaque deposit. For a detailed account of these materials and their properties reference is made to the above mentioned patent. The materials exhibiting this property may be defined as ionic crystals in which the injection of electrons into the crystal lattice can produce an opaque deposit which can be moved within the crystal lattice by application of electric fields and heat. More specifically, the opaque deposit usually can be removed by a more intense concentration of the radiation that produced it, or by the application of an electric field and/or heat to the material.

The above mentioned patent describes a method of television reception which comprises scanning an image screen including a material of the type described with a beam of radiant energy modulated in intensity in accordance with the received picture signals to produce periodically at frame scanning frequency in each elemental area of said screen an opaque deposit the density of which differs from a fixed datum level of density by an amount depending upon the instantaneous value of the intensity of the beam striking the area, and causing the density of said deposit to return to said datum level. The frequency of the return for the successive deposits in said elemental area is, in the mentioned method, equal to the frame scanning frequency.

An object of the present invention is to provide a television receiver employing an image screen of the type described above in which the return of the density of the deposit to the datum level can occupy a time exceeding the frame period.

According to the invention, the screen is movable and is large enough to accommodate several picture areas arranged consecutively in the direction of movement and is arranged to move in such a way that the successive picture areas pass the scanning field in succession at the required frame frequency and there are subjected to the action of the modulated scanning beam which produces the required density distribution of the deposit, the picture areas subsequently passing means for restoring the datum level of the density of the opaque deposit, these means being spatially separated from the scanning field.

The invention is particularly useful when operating under such conditions that the datum level of the density of the deposit is difficult to restore.

The method employed for restoring the datum level of the density of the deposit can comprise the complete removal of the existing, and production of a new, layer of material constituting the screen at the point in question. This allows systems to be used in which deposits of a more persistent type are produced, for instance such deposits as are not formed in an atomic dispersion, but comprise centres agglomerated to particles of colloidal size.

Alternatively, the datum level of the density of the deposit can be restored by irradiation or by the application of an electric field and/or heat to the material.

Figure 2:
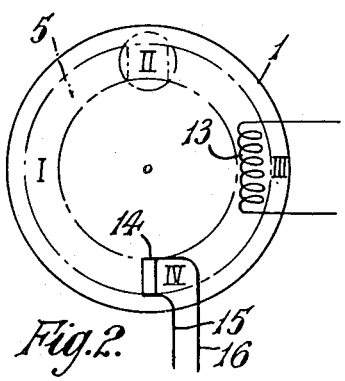
Figure 3:
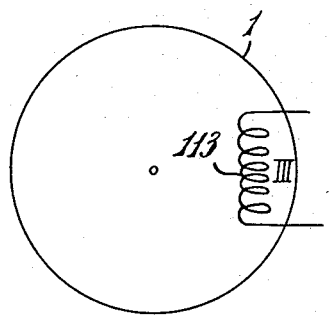
Figure 4:
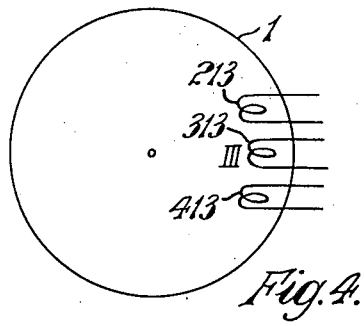
Figure 5:
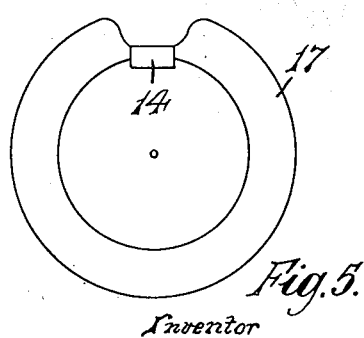
Figure 6:
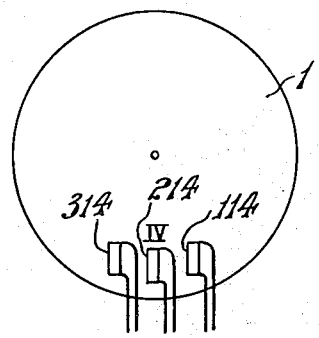
Figure 8:
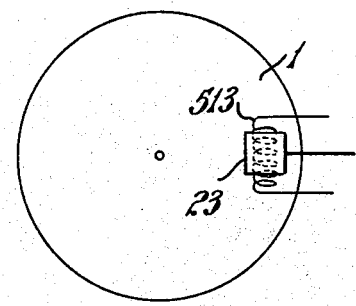
Figure 7:
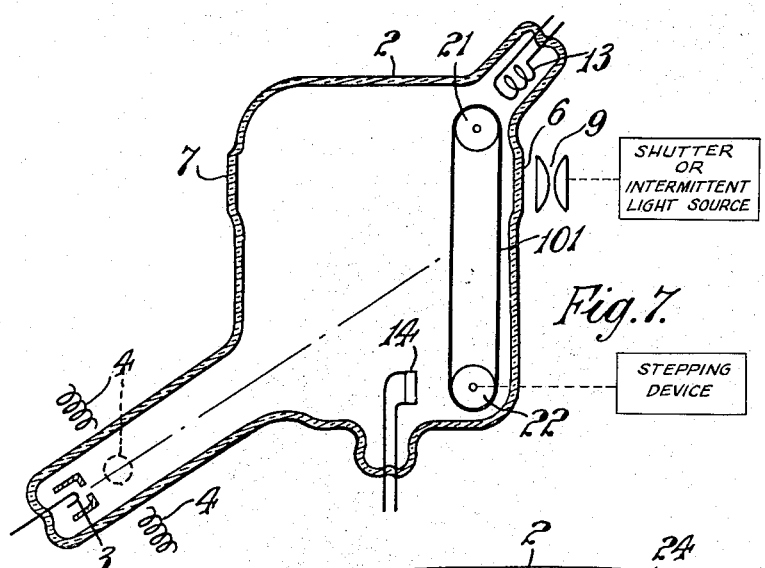
Figure 9:
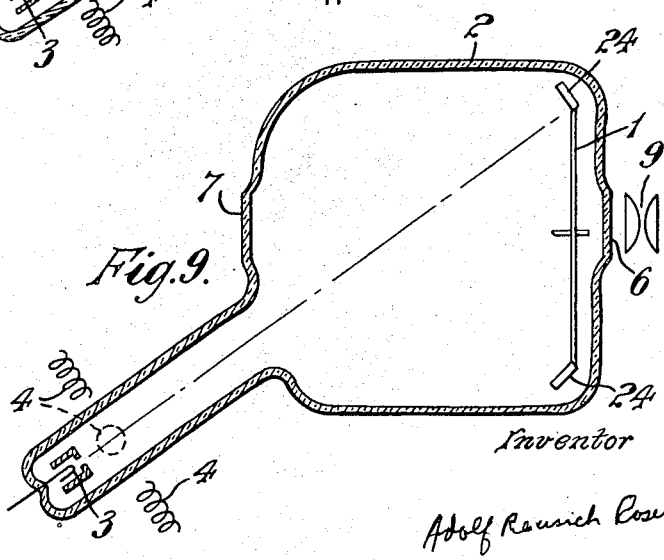

A few typical embodiments of the invention will now be described by way of example with reference to the appended drawings in which Fig. 1 is a side view of a cathode ray television receiving device incorporating the invention, Fig. 2, taking partly the form of an explanatory diagram, is a plan view of an essential part of the device shown in Fig. 1, Figs. 3 to 6, are plan views of details of the part shown in Fig. 2, Figs. 3 and 4 illustrating two alternative forms of a modification of one detail, Figs. 5 and 6 illustrating modification of other details, Fig. 7 is a side view of a cathode ray tube incorporating a modification of the arrangement shown in Fig. 1, Fig. 8 is a plan view of a detail of a modified form of the device shown in Fig. 1, and Fig. 9 is a top view of a cathode ray tube incorporating another modification of the arrangement shown in Fig. 1.

Referring now to Fig. 1, 1 is a picture screen carrier on one side of which is disposed the picture screen in the form of a microcrystalline layer of an alkali halide suitable for the production of an opaque deposit. The carrier 1 is constituted by a circular disc mounted to be capable of rotation in its own plane in a cathode ray tube 2, the screen layer facing the interior of this tube. The tube 2 is provided with an electron gun 3 and cathode ray deflecting means 4 so arranged that the line deflection moves the cathode ray spot in a radial direction within a ring-shaped zone 5 (see Fig. 2) near the circumference of the disc. The frame component of the picture area on this zone is obtained from the combination of the rotation of the disc and the frame deflection of the cathode ray beam, and a straight or an interlaced picture scan can be obtained according to the form of the time function of the frame deflection.

Depending on the ratio between the period of revolution of the screen and frame scanning period, a larger or smaller number of picture areas will be accommodated within the ring-shaped zone 5 of the disc. It is desirable that this ratio should not be made too small, i. e., that a fairly large number of picture areas should be accommodated on the disc, as this, on the one hand, allows a longer time for the various processes to be applied in succession to any given picture area, and on the other hand results in the picture area approximating more closely a rectangular shape.

Incorporated in the electron gun 3 are means for modulating the intensity of the cathode ray beam in accordance with received picture signals so that the opaque deposit is produced, in the picture area that is being scanned, with a density varying in correspondence with the picture signals.

The neighbourhood of the circumference of disc 1 is divided into several regions, hereinafter referred to as processing regions (cf. Fig. 2):

1. The tube is provided with two windows 6 and 7 arranged opposite part of the disc adjacent the region I scanned by the cathode ray beam; this part (the "projection region" II) may be the area of one or several picture frames. A light source and optical means such as condenser 9 and projection lens system 10 are arranged to illuminate, and to project on to a viewing screen 11 an image of, each picture area in turn as it is brought into the projection region II by the rotation of disc 1.

The picture, thus produced on viewing screen 11 as an optical image of any individual picture frame, is immobilized relatively to the viewing screen in any known or suitable manner, e. g., by using as the light source 8 one that flashes for short periods at frame frequency, or by using a shutter operated at that frequency, or, preferably, by compensating the motion of the rotatable screen by a moving optical element or elements, e. g., a system of mirrors, lenses or prisms. The embodiment shown in Fig. 1 incorporates an immobilization arrangement of this preferred type, viz. a rotatable plane-parallel glass body 12. The use of a shutter or intermittent light source is diagrammatically indicated in Figure 7. It will be understood that such arrangements may also be used with the arrangements of the other figures.

2. In a region III adjacent to the projection region II, heating means 13 are associated with the cathode ray tube in such a manner that each picture area, after passing through the projection region II, will be next subjected to a heat treatment sufficient to evaporate the salt layer. As the complete removal of the layer will take a comparatively long time, this region III of heat treatment is arranged to extend along a comparatively long portion of the annular zone comprising the effective picture areas of the screen.

The heat treatment may be graded along this path. For instance, a heating coil may be used which possesses such a distribution of pitch that it radiates a different amount of heat from different parts, as is indicated in Fig. 3, coil 113. Or a set of coils, such as 213, 313, 413, Fig. 4, may be used, different coils being heated to different temperatures.

3. The cathode ray tube 2 comprises means of any known or suitable kind for applying a fresh salt layer to disc 1 in a region IV where the parts of the annular zone arrive after undergoing the heat treatment removing the former salt layer. These means preferably comprise a container for the salt such as the boat 14 having heating means associated therewith for evaporating the salt on to the disc. Thus, D. C. or A. C. heating currents may be carried from a source, not shown, by leads 15 and 16, or boat 14 may be associated with an induction ring 17, Fig. 5, which is heated by eddy currents produced by induction from high frequency apparatus (not shown).

The circumferential length of the region IV of salt application is again adapted, in relation to the length of the other effective regions, in accordance with the relative time required for the production of a satisfactory layer.

The formation of the new layer may again be performed in graded steps as is indicated in Fig. 6 illustrating the provision of a plurality of evaporating boats 114, 214, and 314, especially if the layer is constituted by a plurality of component layers of different salts, or if it is desired to apply sensitising agents. Thus one of the boats may contain a material adapted to develop, when heated, vapours of a heavy metal or heavy metal compound atoms or molecules of which are built into the crystal lattice of the screen material and act as sensitisers as is set forth in the above mentioned patent.

4. If desired, further processing regions may be provided for by inclusion of further means for treating the screen. For example the fresh salt layer may be subjected to a temperature treatment such as sintering by heat or tempering through sudden cooling by air or water cooled bodies brought into the neighbourhood of the disc.

If the period required for removing the old salt layer and preparing a new one ready for use is long in comparison with the frame scanning period (which has a standard value, e. g. $\frac{1}{25}$ sec.), the rotatable disc 1 must be large enough to accommodate a correspondingly large number of picture areas so that its revolution period T may be long. In the converse case, a higher revolution frequency may be combined with a smaller number of picture areas on the disc.

As shown in Fig. 1, disc 1 may be mounted on the shaft 18 of an electromotor comprising stator 19 and rotor 20 so as to provide the required rotation of the disc.

The device described allows of many modifications. Thus, instead of rotating continuously, the screen may rotate in steps, in which case special means for immobilizing the projected image may be dispensed with, the projection then being performed in a manner similar to standard film projection in that a mechanical shutter cuts off the light during the time in which the disc moves. A stepping device is diagrammatically indicated in connection with Figure 7 by the block designated "Stepping device." In this case, the cathode ray deflection, instead of being arranged to be combined with the screen movement to give the required type of scanning, may be of the conventional type. The line scanning may, particularly in the last mentioned case, take place in a direction other than the radial one.

It should be noted that, while it is readily possible to arrange for interlaced line scanning, as mentioned above, there is no need for doing so in apparatus according to the invention. Due to the fact that, in the system according to the invention, the recording of a picture and its optical projection are completely independent from each other, i. e. a complete storage of the recorded picture is achieved, the lowest number of frames consistent with the requirement of a smooth appearance of movements within the picture, i. e. about 15 frames per second, will give satisfactory results. The frequency band width for the vision signal transmission can thereby be considerably reduced. Flicker can be reduced by any method known in the art of moving picture projection, e. g. by interrupting ("chopping") the light beam every 50th of a second by means of a shutter, or by overlapping immobilizing projection with constant brilliance.

The screen material, instead of being arranged on a disc rotatable in its own plane, may be carried on a band (or film) arranged to move over rollers, as is shown in Fig. 7, band 101 taken over rollers 21 and 22. The term "rotating" as used in the appended claims is intended to cover this type of movement also.

With certain materials the opaque deposit can be removed by the action of radiation or an electric field and/or heat, without the necessity of altogether removing and replacing the salt layer. Suitable means for re-establishing a datum level of opacity, such as have been disclosed in detail in my mentioned patent, are then substituted for the means for evaporating the old layer and the means for preparing the new one. Thus, a field electrode such as electrode 23, Fig. 8, may be provided, the other electrode being constituted by a conductive coating applied to the disc, for example a semitransparent metal layer or an oxide layer on to which the salt is evaporated. The means for applying an electric field may be combined with heating means such as the coil 513, Fig. 8.

If desired, especially for the purpose of cinema television reception, a demountable cathode ray device, preferably of metal, with a pump arrangement may be used so that the materials used may be easily replaced from time to time.

The movement of the carrier of the screen material may be effected by any known or suitable type of synchronous motor or electromagnetic system acting on members mechanically connected with the screen. Alternatively, the mechanical action of the cathode ray beam, acting preferably during the synchronizing intervals on suitable wing extensions of the screen (see wings 24, Fig. 9) may be utilized to effect this movement.

By way of definition, the language employed in this specification and in the appended claims is to be understood to mean that wherever the terms "a beam of radiant energy," "a beam having electromagnetic energy," "to create on said layer an image in accordance with a received signal" and "beam of energy having wave and particle characteristics" occur, these expressions are intended to be generic to beams either of wave or electron variety.

I claim:

1. A scanning transparency control device comprising an envelope, a rotatable screen carrier in said envelope, a layer covering a zone on said screen carrier of a material the transparency of which can be controlled by cathode ray beam and being an ionic crystal material of the type in which the injection of electrons into the crystal lattice can produce an opaque deposit covering a zone on said screen carrier, means for scanning a portion of said layer with a cathode ray beam modulated in intensity in accordance with electrical variations, in such a manner that when said screen carrier is rotated, successive areas of said layer are scanned, at least one window in said envelope, and means for restoring a datum level of intensity in said layer, said zone on said screen carrier, and said scanning means, window, and restoring means being arranged in such positions that any portion of said zone during rotation of said screen carrier passes under the influence of said scanning means, window, and restoring means in the order mentioned.

2. In an image forming apparatus, a carrier movable in a predetermined path, said carrier including a layer of an ionic crystal material of the type in which the injection of radiant energy into the crystal lattice can produce an opaque deposit, means for directing upon the screen layer a scanning cathode ray beam modulated in accordance with a received signal, means to direct light through said carrier layer, means to remove the layer from the carrier, means to apply a fresh deposit to said carrier, and means to move a given area of said carrier successively past said beam directing means, said light directing means, and said deposit removing means.

3. Apparatus of the type described in claim 2 wherein said carrier is rotatable about a fixed axis.

4. Apparatus of the type described in claim 2 wherein said carrier is an endless strip.

5. Apparatus of the type described in claim 2 wherein an envelope encloses said carrier and radiant energy beam directing means.

6. Apparatus of the type described in claim 2 including means to periodically operate said light directing means.

7. Apparatus of the type described in claim 2 including means to periodically operate said light directing means, and means to move said carrier alternately with operation of said light directing means.

8. Apparatus of the type described in claim 2 including a screen, and means to direct light from said carrier to said screen.

9. In an image forming apparatus, a carrier movable in a predetermined path, said carrier including a layer of an ionic crystal material, means to direct upon said layer a cathode ray beam modulated in intensity in accordance with a received signal to vary the light transmitting qualities of said layer from a normal datum level by creation in the layer of areas movable between the faces of the layer and having light transmitting qualities differing from said datum level, means to direct light through said layer, means to restore the light transmitting qualities of said layer to said normal datum level, and means to move a given area of said carrier successively past said three means.

10. An apparatus of the character described in claim 9 wherein said means to restore the light transmitting qualities of said layer comprises a source of heat.

11. An apparatus of the character described in claim 9 wherein said means to restore the light transmitting qualities of said layer comprises an electrical field.

12. Apparatus of the type described in claim 9 wherein said carrier is rotatable about a fixed axis.

13. Apparatus of the type described in claim 9 wherein said carrier is an endless strip.

14. Apparatus of the type described in claim 9 wherein an envelope encloses said carrier and radiant energy beam directing means.

15. Apparatus of the type described in claim 9 including means to periodically operate said light directing means.

16. Apparatus of the type described in claim 9 including means to periodically operate said light directing means, and means to move said carrier alternately with operation of said light directing means.

17. Apparatus of the type described in claim 9 including a screen, and means to direct light from said carrier to said screen.

18. In an image forming apparatus, a carrier movable in a predetermined path, said carrier including a layer of an ionic crystal material, means to direct upon said layer a cathode ray beam modulated in intensity in accordance with a received signal to vary the light transmitting qualities of said layer from a normal datum level by creation in the layer of areas movable between the faces of the layer and having light transmitting qualities differing from said datum level to thereby create an image in said layer, means to direct light through said layer, means to remove the image formed in the layer, and means to move a given area of said carrier successively past said three means.

19. Apparatus of the type described in claim 18 wherein said carrier is rotatable about a fixed axis.

20. Apparatus of the type described in claim 18 wherein said carrier is an endless strip.

21. Apparatus of the type described in claim 18 wherein an envelope encloses said carrier and radiant energy beam directing means.

22. Apparatus of the type described in claim 18 including means to periodically operate said light directing means.

23. Apparatus of the type described in claim 18 including means to periodically operate said light directing means, and means to move said carrier alternately with operation of said light directing means.

24. Apparatus of the type described in claim 18 including a screen, and means to direct light from said carrier to said screen.

25. An apparatus of the character described in claim 18 wherein the image removing means comprises an electrical field.

26. An apparatus of the character described in claim 18 wherein the image removing means comprises a source of heat.

27. A scanning transparency control device comprising an envelope, a rotatable screen carrier in said envelope, a layer covering a zone on said screen carrier of a material the transparency of which can be controlled by a beam of radiant energy, and being an ionic crystal material of the type in which the injection of electrons into the crystal lattice can produce an opaque deposit covering a zone on said screen carrier, means for scanning a portion of said layer with a beam having electromagnetic energy and modulated in intensity in accordance with electrical variations, in such a manner that when said screen carrier is rotated, successive areas of said layer are scanned, at least one window in said envelope, and means for restoring a datum level of intensity in said layer of said zone on said screen carrier, and said scanning means, window, and restoring means being arranged in such positions that any portion of said zone during rotation of said screen carrier passes under the influence of said scanning means, window, and restoring means in the order mentioned.

28. A scanning transparency control device comprising an envelope, a rotatable screen carrier in said envelope, a layer covering a zone on said screen carrier of a material the transparency of which can be controlled by a beam of radiant energy, and being an ionic crystal material of the type in which the injection of electrons into the crystal lattice can produce an opaque deposit covering a zone on said screen carrier, means for scanning a portion of said layer with a cathode ray beam modulated in intensity in accordance with electrical variations, in such a manner that when said screen carrier is rotated, successive areas of said layer are scanned, at least one window in said envelope, and means for restoring a datum level of intensity in said layer, said zone on said screen carrier, and said scanning means, window, and restoring means being arranged in such positions that any portion of said zone during rotation of said screen carrier passes under the influence of said scanning means, window, and restoring means in the order mentioned.

29. In an image forming apparatus, a carrier movable in a predetermined path, said carrier including a layer of an ionic crystal material, means to direct upon said layer a cathode ray beam modulated in intensity in accordance with a received signal to vary the light transmitting qualities of said layer from a normal datum level by creation in the layer of opacity centers between the faces of the layer having light transmitting qualities differing from said datum level, means to direct light through said layer, means to restore the light transmitting qualities of said layer to said normal datum level, and means to move a given area of said carrier successively past said three means.

30. A scanning transparency control device comprising an envelope, a rotatable screen carrier in said envelope, a layer covering a zone on said screen carrier of a material the transparency of which can be controlled by a cathode ray beam and being an ionic crystal material of the type in which the injection of electrons into the crystal lattice can produce an opacity area covering a zone on said screen carrier, means for scanning a portion of said layer with a cathode ray beam modulated in intensity in accordance with electrical variations, in such a manner that when said screen carrier is rotated, successive areas of said layer are scanned, at least one window in said envelope, and means for restoring a datum level of intensity in said layer of said zone on said screen carrier, and said scanning means, window, and restoring means being arranged in such positions that any portion of said zone during rotation of said screen carrier passes under the influence of said scanning means, window, and restoring means in the order mentioned.

ADOLPH H. ROSENTHAL.

REFERENCES CITED

The following references are of record in the file of this patent:

UNITED STATES PATENTS

| Number | Name | Date |
| --- | --- | --- |
| Re. 22,734 | Rosenthal | Mar. 19, 1946 |

(Other references on following page)

UNITED STATES PATENTS

| Number | Name | Date |
|---|---|---|
| 168,465 | Edison | Oct. 5, 1875 |
| 1,648,058 | Parker | Nov. 8, 1927 |
| 1,648,687 | Hoxie | Nov. 8, 1927 |
| 1,736,456 | Matthias | Nov. 19, 1929 |
| 2,026,872 | De Forest | Jan. 7, 1936 |
| 2,086,718 | Knoll | July 13, 1937 |
| 2,143,214 | Selenyi | Jan. 10, 1939 |
| 2,155,033 | Barthelemy | Apr. 18, 1939 |
| 2,203,352 | Goldmark | June 4, 1940 |
| 2,203,353 | Goldmark | June 4, 1940 |
| 2,268,523 | Clothier et al. | Dec. 30, 1941 |

FOREIGN PATENTS

| Number | Country | Date |
|---|---|---|
| 1,763 | Russia | Oct. 30, 1926 |
| 27,243 | Great Britain | 1897 |
| 234,583 | Germany | July 15, 1911 |
| 321,935 | Great Britain | Nov. 11, 1929 |
| 536,720 | Great Britain | May 26, 1941 |
| 777,409 | France | Feb. 20, 1935 |

OTHER REFERENCES

Proc. Phys. Soc. of London, pages 3 to 31, Aug. 1937.